(12) United States Patent  
Steinke et al.

(10) Patent No.: US 8,136,758 B2
(45) Date of Patent: Mar. 20, 2012

(54) HYBRID STRUT COMPRISING METAL AND COMPOSITE PORTIONS

(75) Inventors: Douglas J. Steinke, South Bend, IN (US); Allen H. Simpson, Buchanan, MI (US); Manuel G. Koucouthakis, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 801 days.

(21) Appl. No.: 12/216,866

(22) Filed: Jul. 11, 2008

(65) Prior Publication Data

US 2010/0006698 A1  Jan. 14, 2010

(51) Int. Cl.
*B64C 25/00* (2006.01)

(52) U.S. Cl. ............. 244/100 R; 244/133; 138/146

(58) Field of Classification Search .......... 244/100 R, 244/102 R, 102 A, 133; 428/376, 379; 52/309.15, 52/309.16; 138/146
See application file for complete search history.

(56) References Cited

U.S. PATENT DOCUMENTS

| | | | |
|---|---|---|---|
| 3,193,221 A * | 7/1965 | Victorian et al. | 244/100 R |
| 4,230,293 A * | 10/1980 | Hamm et al. | 244/119 |
| 4,244,413 A | 1/1981 | Takahashi et al. | |
| 4,336,868 A | 6/1982 | Wilson et al. | |
| 4,505,979 A * | 3/1985 | Ruegg et al. | 428/379 |
| 4,539,055 A * | 9/1985 | Orcutt | 156/92 |
| 4,807,522 A | 2/1989 | Saarela et al. | |
| 4,821,983 A | 4/1989 | Aubry et al. | |
| 5,048,441 A | 9/1991 | Quigley | |
| 5,080,444 A | 1/1992 | Hopkins et al. | |
| 5,211,359 A | 5/1993 | Rene et al. | |
| 5,224,669 A | 7/1993 | Guimbal et al. | |
| 5,925,449 A | 7/1999 | Davidovits et al. | |
| 5,985,072 A | 11/1999 | Finck et al. | |
| 7,220,492 B2 | 5/2007 | Fick et al. | |
| 7,377,596 B2 | 5/2008 | Steinke et al. | |
| 2005/0056503 A1 | 3/2005 | Jones | |
| 2005/0238868 A1 | 10/2005 | Joseph et al. | |
| 2006/0043237 A1 | 3/2006 | Cordy | |
| 2006/0060700 A1 | 3/2006 | Anderton et al. | |
| 2006/0284009 A1 | 12/2006 | Kismarton | |
| 2007/0007386 A1 | 1/2007 | Coupe et al. | |

FOREIGN PATENT DOCUMENTS

WO  WO-02/078951 A1  10/2002
WO  WO-2006/118448 A1  11/2006

OTHER PUBLICATIONS

"Case Study Composite Landing Gear Struts", LUSAS, p. 1, (2007).
"650 Certified", SKY Arrow, pp. 1-2 (2007).
"Boron-Epoxy-Reinforced Titanium Aircraft Landing-Gear Drag Strut", Storming Media, p. 1 (2007).

* cited by examiner

*Primary Examiner* — Rob Swiatek
(74) *Attorney, Agent, or Firm* — Shumaker & Sieffert, P.A.

(57) ABSTRACT

A strut (18, 50) includes a fiber-reinforced, elongate composite body (36, 54) and has first and second ends and a metal and/or tubular support (20, 52) at least partially embedded in the composite body (36, 54), where the composite body (36, 54) has first (40, 60) and second ends (42, 62) forming first and second load-bearing end portions of the strut (18, 50). Also a method forms such a strut using a mold (70).

19 Claims, 5 Drawing Sheets

HYBRID STRUT COMPRISING METAL AND COMPOSITE PORTIONS

FIELD OF THE INVENTION

The present invention is directed toward a strut having metal and composite portions and to a method of making same, and, more specifically, toward a strut for aircraft landing gear having a tubular metal structural member at least partially embedded in a composite resin and to a method of making same.

BACKGROUND OF THE INVENTION

It is common to make structural members, such as struts, from steel and other metal alloys. Steel may be used in many strut applications, and may, for example, form the struts that connect aircraft wheels to an aircraft body.

Aircraft weight affects fuel efficiency and limits the mass of cargo and passengers that can be carried. It is therefore generally desirable to reduce the weight of aircraft components to increase fuel efficiency and/or load capacity of an aircraft. One method of reducing aircraft weight is to form various components from lighter weight materials. One material useful for some weight reduction applications comprises a composite resin that may be reinforced with carbon or other fibers. However, various factors, including strength requirements, appearance, and the conditions to which the components are subjected, limit the materials that can be used for certain applications. In some cases, substituting a composite material for a metallic element will require a change to the size, shape or construction of the element being replaced. It is generally not possible to reduce aircraft weight merely by replacing every metallic element in the aircraft with an identical composite member.

Aircraft landing gear struts are examples of metallic parts that cannot easily be replaced with composite elements. Struts formed from composites are known. However, the composites are generally weaker than steel, and to date their use has been limited to lightweight aircraft such as commuter aircraft. Composites are generally not considered sufficiently strong to support the greater masses of commercial and/or military aircraft and may not withstand the stresses absorbed by the landing gear when such aircraft land. Consequently, commercial and military aircraft continue to use steel or other metal or metal alloy struts. It would therefore be desirable to provide a strut that is lighter than steel and stronger than existing composite struts and that is suitable for use as an aircraft landing gear strut.

SUMMARY OF THE INVENTION

These problems and others are addressed by embodiments of the present invention, a first aspect of which comprises a strut having a fiber-reinforced, elongate composite body with first and second ends, and a metal support at least partially embedded in the composite body, where the composite body first and second ends form first and second load-bearing end portions of the strut.

Another aspect of the invention is an aircraft landing gear component that includes a strut having a first end and a second end and a wheel connected to the strut second end. The strut includes a tubular metal support having a longitudinal axis, a cylindrical wall having an inner surface, an outer surface and a plurality of through openings between the inner surface and the outer surface, and a composite body at least partially covering the metal support. A plurality of reinforcing fibers are located at least in a portion of the composite body overlying the outer surface.

An additional aspect of the invention is a method of forming a strut that includes steps of providing a strut-shaped mold, providing a tubular metal member having a cylindrical wall having plurality of through openings, and placing the tubular metal member in the strut-shaped mold. Reinforcing fibers are placed in the mold around the tubular metal member, and the mold is filled a composite resin. The resin is allowed to cure, and the cured resin and tubular metal member are removed from the mold.

BRIEF DESCRIPTION OF THE DRAWINGS

These aspects and features of the invention and others will be better understood after a reading of the following detailed description together with the attached drawings wherein.

DETAILED DESCRIPTION

Figure 1:
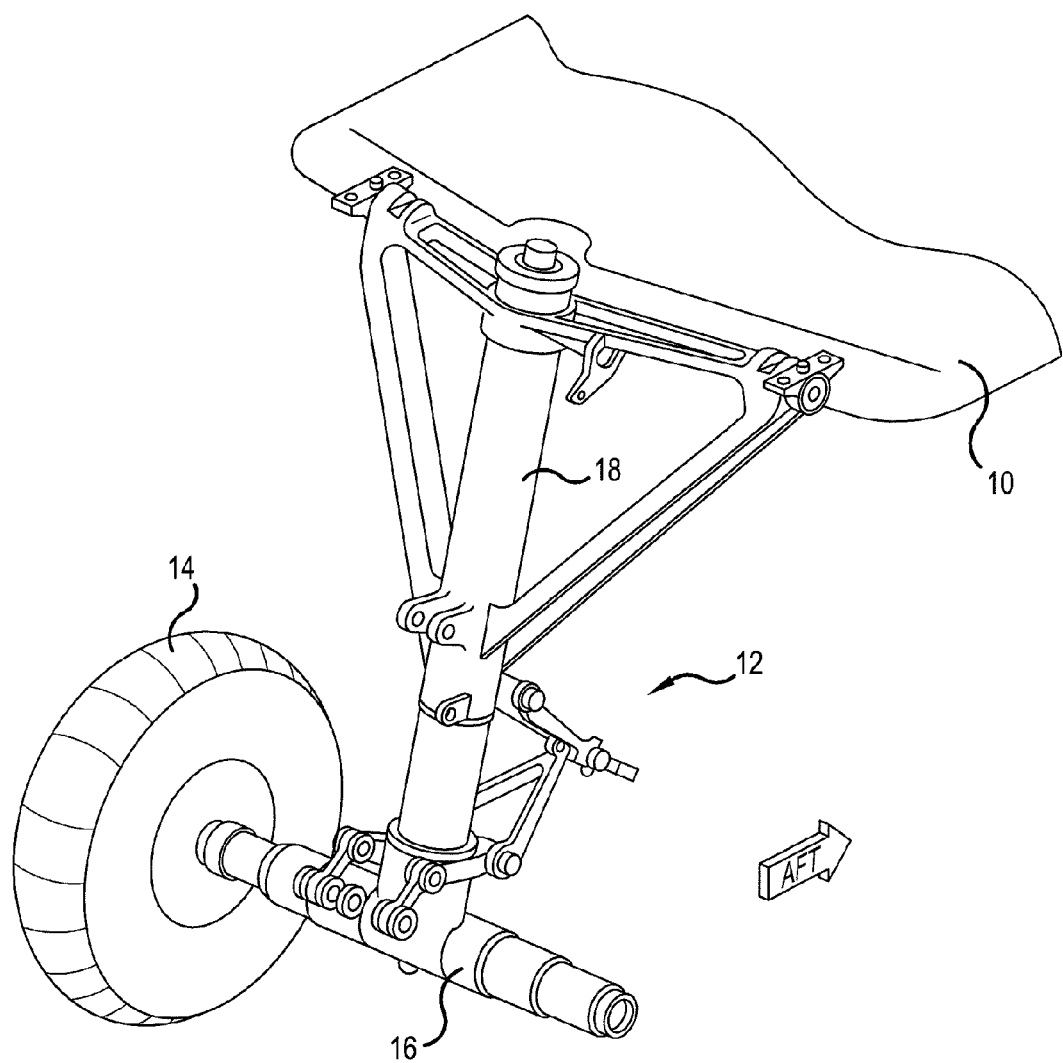
FIG. 1 is a perspective view of part of an aircraft landing gear assembly including a strut and a wheel.

Referring now to the drawings, wherein the showings are for purposes of illustrating embodiments of the invention only and not for the purpose of limiting same, FIG. 1 illustrates a partial view of an aircraft 10 having a landing gear system 12. Landing gear system 12 includes first and second wheels 14, only one of which is shown, an axle 16 connecting the wheels 14, and a strut 18 connecting the axle 16 and hence the wheels 14, to the aircraft 10.

Figure 2:
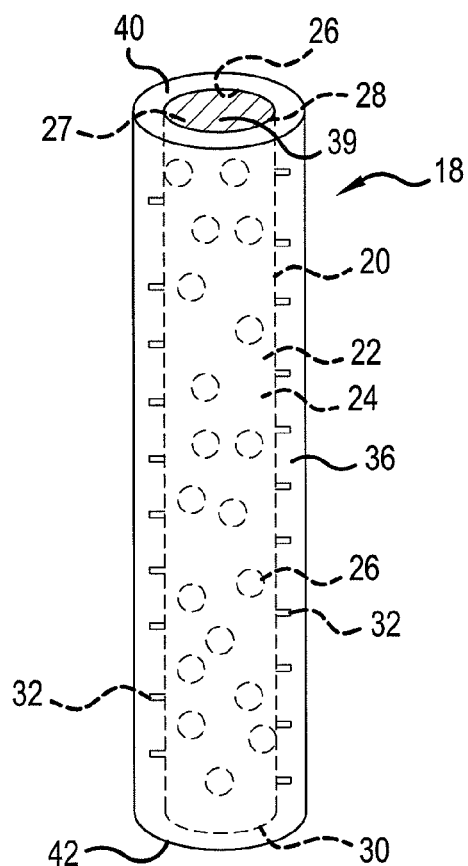
FIG. 2 is a perspective view of the strut of FIG. 1.
Figure 3:
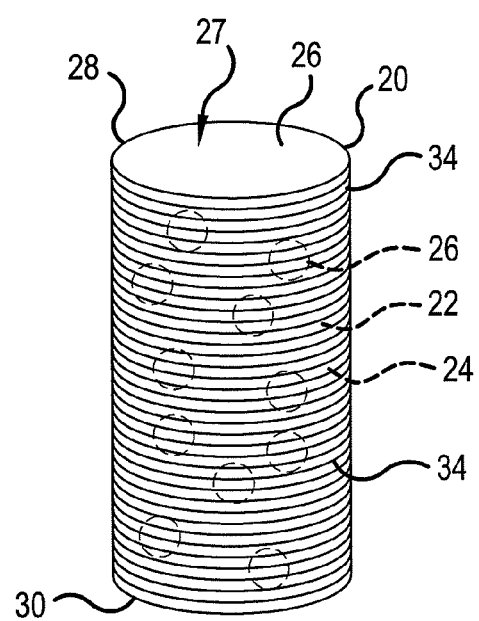
FIG. 3 is a perspective view of a metal tube wrapped with carbon fibers suitable for assembly into the strut of FIG. 1.

A first embodiment of strut 18 is illustrated in FIG. 2 and comprises a tubular steel member 20 at least partially embedded in a body 36 of composite material. Without intending to limit the invention to a particular resin and/or fiber, it is currently envisioned that carbon/carbon fibers embedded in an epoxy resin would be used for such applications. Steel member 20 comprises a cylindrical wall 22 having an outer surface 24 and an inner surface 26 defining an interior 27. A plurality of irregularly distributed through openings 26 extend between outer surface 24 and inner surface 26, and the member 20 further includes a first end 28 and a second end 30. A plurality of studs 32 project from outer surface 24 for reasons discussed hereinafter. FIG. 3 illustrates steel member 20 wrapped in a radial direction with one or more reinforcing fibers 34 which may be referred to herein as "wound" fibers to distinguish them from other reinforcing fibers discussed herein. The steel member may also be wound lengthwise and circumferentially with wound fibers 34. Wound fibers 34 are also present in the strut 20 of FIG. 2 but are not visible because they are covered by molded composite body 36.

Figure 5:
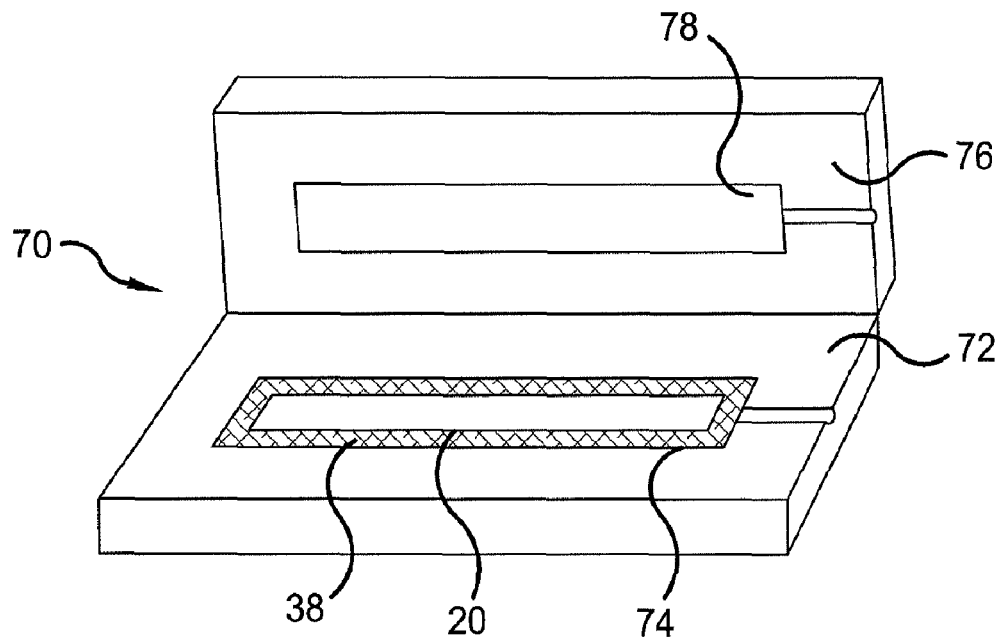
FIG. 5 is a perspective view of a mold, in an open state, for forming the strut of FIG. 1.
Figure 6:
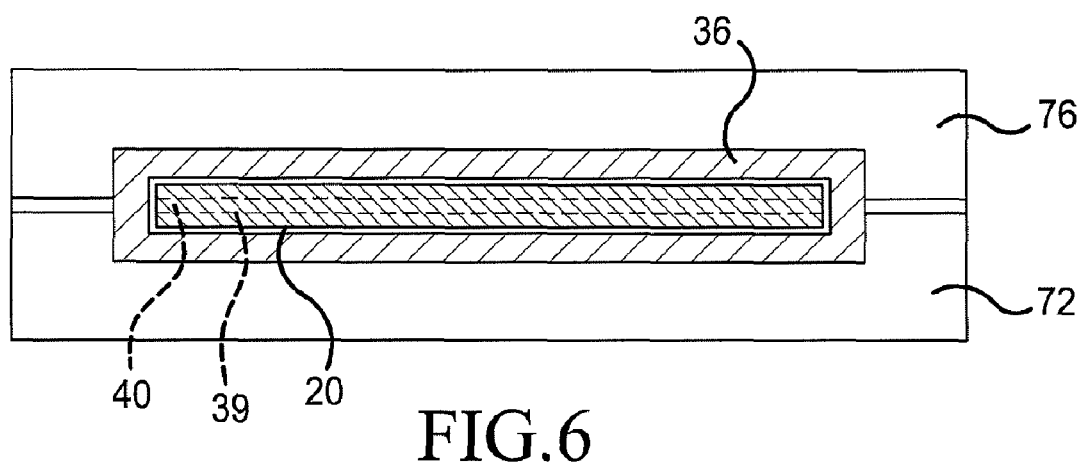
FIG. 6 is a sectional side elevational view of the mold of FIG. 5 in a closed state.

Composite body 36 substantially surrounds tubular member 20 over outer surface 24 while a lightweight resin material 39 fills interior 27. Resin material 39 may include longitudinally disposed reinforcing fibers 40. Reinforcing fibers 38, illustrated in FIGS. 5 and 6, are embedded in at least the portion of composite body 36 surrounding the outer surface of tubular member 20 to increase the strength of the strut 18. The composite material forming composite body 36 could alternately be allowed to fill the interior 27 of the strut, but this would tend to increase the weight of the strut. The interior reinforcing fibers 40 are generally aligned in the direction of the longitudinal axis of the strut 18. The orientation of the fibers 38 outside tubular member 20 may be more random.

Wound reinforcing fibers 34 are provided to help bond the composite resin material of body 36 to tubular steel member 20. Other methods of improving a metal-to-composite bond could also be used. One such method is disclosed in co-pending patent application Ser. No. 11/730,373, entitled "Bonding of Carbon Fibers to Metal Inserts for Use in Composites," which application is assigned to the assignee of the present application and the entire contents of which are hereby incorporated by reference. Studs 32 on tubular member 20 also help improve the bond between the composite body 36 and the tubular member 20.

The strut 18 thus formed from embedding tubular steel member 20 in resin body 36 has a first load bearing surface 40 and a second load bearing surface 42. This strut benefits from the combined properties of the steel and the composite to provide a satisfactory level of compressive strength along its length. Strut 18, for example, is lighter than a comparably sized solid steel strut but substantially stronger than either the steel tubular member 20 or the composite body 36 taken alone. In fact, it is believed that the compressive strength of the strut 18 will be greater than the sum of the compressive strength of the tubular member 20 and the compressive strength of the composite body 36 taken individually. This arrangement thus allows the use of composite material in an aircraft landing gear strut to reduce the weight of the strut while retaining sufficient strength to allow the strut to be used where some struts made entirely from composite material would likely fail.

Figure 4:
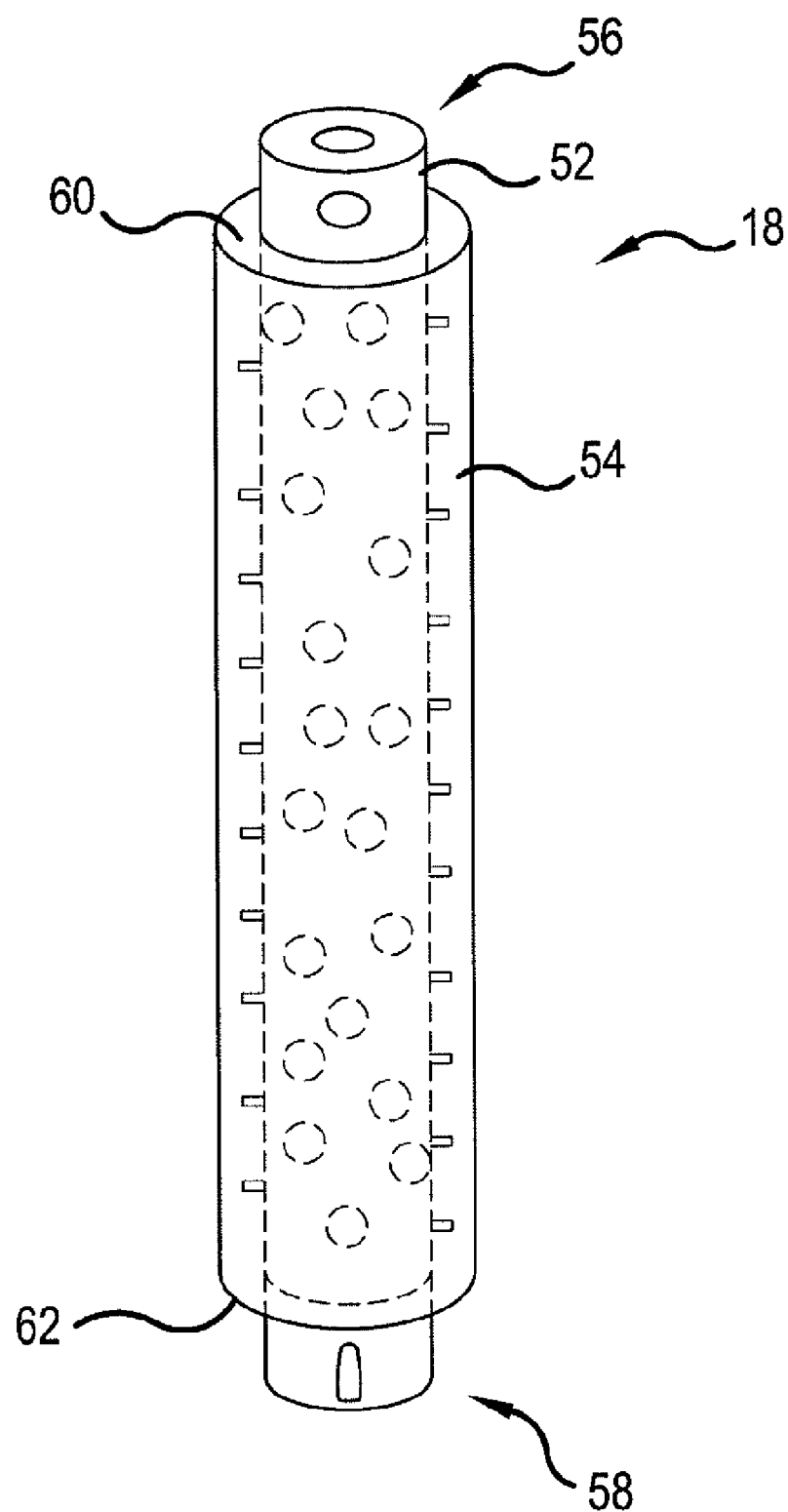
FIG. 4 is a perspective view of a second embodiment of a strut according to the present invention.

A strut 50 according to a second embodiment of the present invention is illustrated in FIG. 4. Strut 50 comprises a tubular steel member 52 partially embedded in a composite body 54 reinforced with carbon or other fibers (not shown) as described above in connection with the first embodiment. Tubular steel member 52 is longer than composite body 54 so that a first end 56 of the steel member 52 is exposed at one end of the strut 50 and a second end 58 of the steel member 52 is exposed at the opposite end of the strut 50. First end 56 of the steel member 52 may form a first attachment portion for connecting strut 50 to the body of aircraft 10, and second end 58 of steel member 52 may form a second attachment portion for attaching the strut 50 to an axle 16. The metal tube 52 may directly bear some compressive loads due to its direct connection with the aircraft and axle 16; however, strut 50 also includes a first annular load bearing surface 60 and a second annular load bearing surface 62 which, in some applications, may also help support a longitudinally compressive load on the strut 50 so that loads are supported by the steel member 52 and composite body 54 working together.

FIG. 5 illustrates a mold 70 that includes a lower mold half 72 having a semi-cylindrical opening 74 and an upper mold half 76 having a similar semi-cylindrical opening 78 aligned with the opening 74 in the lower mold half to define a cylindrical shape when the upper and lower mold halves are closed. To form strut 18 of the first embodiment discussed above, reinforcing fibers 40, illustrated in FIG. 6, are placed into tubular steel member 20, tubular steel member 20 is filled with a suitable lightweight resin material and the resin is allowed to cure. This step substantially prevents the composite material used to form body portion 36 of the strut from entering the interior 27 of tubular steel member 20 and thus reduces the weight of the finished strut. Tubular steel member 20 is then wound with carbon/carbon or other suitable wound reinforcing fibers 34 and/or subjected to suitable treatments to improve composite-to-metal bonding. Thus treated, the tubular steel member 20 is placed in the mold 70 and surrounded with reinforcing fibers 38. The mold 70 is then closed and filled with a suitable composite resin material which infiltrates the reinforcing fibers 38 surrounding tubular steel member 20. The reinforcing fibers 38 are present inside the resin body 36 but are not illustrated in FIG. 6. The composite material is allowed to harden, and the strut 18 is removed from the mold. The strut can be molded to a near net shape and thus little or no further machining is needed before the strut 18 is ready for use. The strut 50 of the second embodiment can be formed in a similar manner except that the first end 56 and the second end 58 of the steel member 52 are positioned in a suitable mold so that they are not coated with the composite material.

Figure 7:
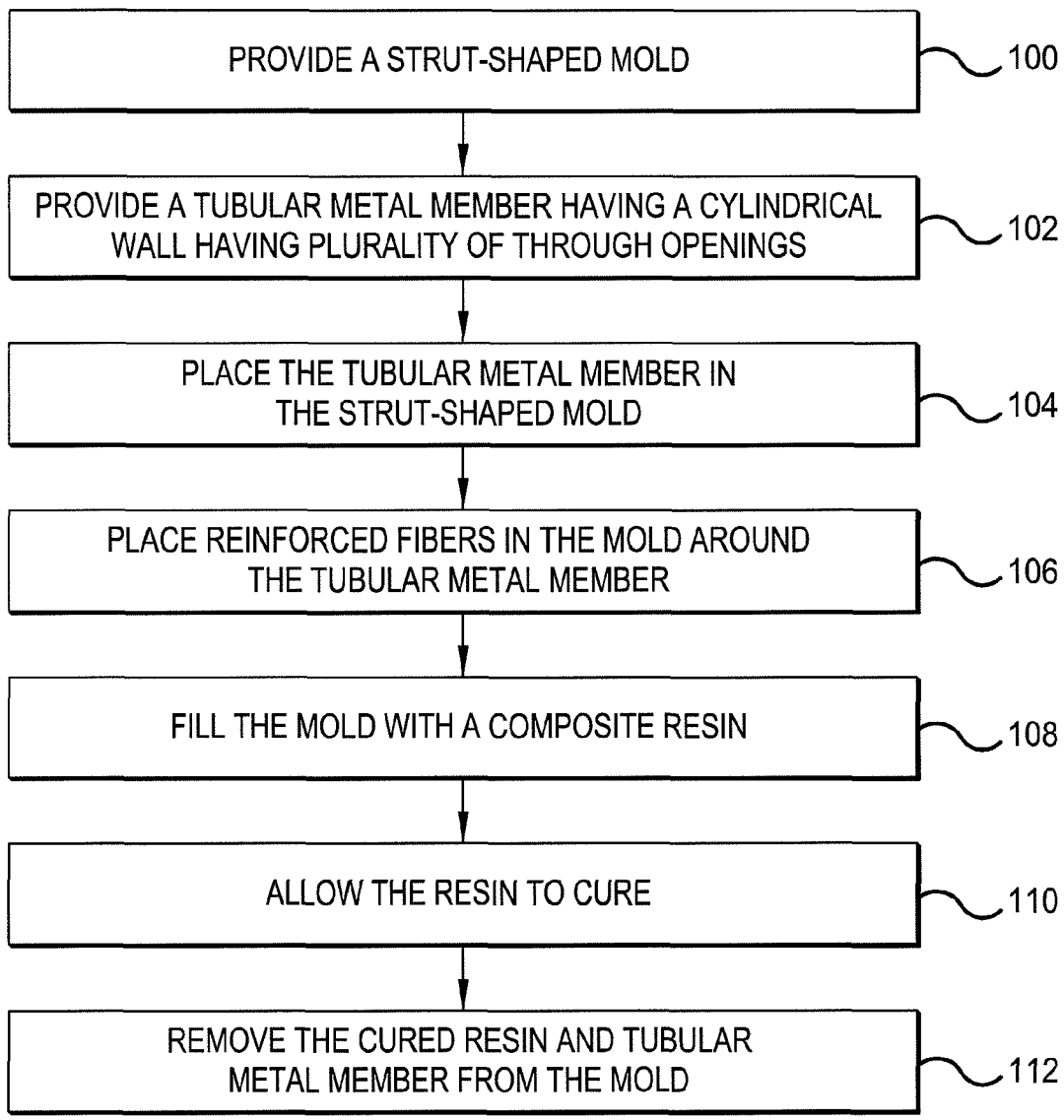
FIG. 7 is a flow chart illustrating a method according to an embodiment of the present invention.

A method according to an embodiment of the present invention is illustrated in FIG. 7 and includes a step 100 of providing a strut-shaped mold, a step 102 of providing a tubular metal member having a cylindrical wall with a plurality of through openings and a step 104 of placing the tubular metal member in the mold. The method further involves a step 106 of placing reinforcing fibers in the mold around the tubular member, a step 108 of filling the mold with a composite resin, a step 110 of allowing the resin to cure and a step 112 of removing the cured resin and embedded steel member from the mold. To further reduce the weight of the strut, in some cases it may be desirable to fill the interior 27 of the tubular member 20 with a light-weight resin and to allow the resin to cure before wrapping the tubular member 20 in fiber and embedding the tubular member 20 in additional composite material.

The present invention has been described herein in terms of several preferred embodiments. However, modifications and additions to these embodiments will become apparent to those of ordinary skill in the art upon a reading of the foregoing descriptions. It is intended that all such modifications and additions comprise a part of the present invention to the extent they fall within the scope of the several claims appended hereto.

What is claimed is:

1. A strut comprising:
 a fiber-reinforced, elongate composite body comprising composite body first and second ends; and
 a metal support at least partially embedded in the composite body, wherein the metal support is tubular and comprises a wall comprising a plurality of through openings, and wherein the plurality of through openings are covered by the composite body,
 the composite body first and second ends forming first and second load-bearing end portions of the strut.

2. The strut of claim 1, the wall comprises a cylindrical wall.

3. The strut of claim 2, further including a plurality of studs projecting from the cylindrical wall away from a longitudinal axis of the tubular metal support.

4. The strut of claim 1, further including carbon fiber wound around the tubular metal support.

5. The strut of claim 1, further including a composite resin material filling an interior of the tubular metal support.

6. The strut of claim 5, further including reinforcing fibers in the composite resin material filling the interior of the tubular metal support.

7. The strut of claim 1, wherein the tubular metal support includes metal support first and second ends and wherein at least the metal support first end extends beyond the composite body first end.

8. The strut of claim 1, wherein a first compressive strength of the strut is greater than a sum of a second compressive strength of the composite body and a third compressive strength of the metal support.

9. The strut of claim 1, further including a strut first end connection region and a strut second end connection region, wherein the strut first end connection region is configured to be connected to an aircraft and the strut second end connection region is configured to be connected to an aircraft wheel.

10. An aircraft landing gear component comprising:
a strut comprising a strut first end and a strut second end; and
a wheel connected to the strut second end,
the strut comprising:
a tubular support comprising a longitudinal axis, a cylindrical wall comprising an inner surface, an outer surface and a plurality of through openings between the inner surface and the outer surface;
a composite body covering the plurality of through at least partially covering the tubular support, and
a plurality of reinforcing fibers located at least in a portion of the composite body overlying the outer surface.

11. The aircraft landing gear component of claim 10, wherein the tubular support is metal.

12. The aircraft landing gear component of claim 11, further including at least one winding fiber wound around the tubular metal support in a radial direction.

13. The aircraft landing gear component of claim 11, further including a plurality of studs projecting from the cylindrical wall outer surface.

14. The aircraft landing gear component of claim 10, further including a composite resin material filling an interior of the tubular support, wherein the plurality of reinforcing fibers are located in a portion of the composite resin material inside the tubular support.

15. The aircraft landing gear component of claim 14, wherein the composite resin material extends through the plurality of through openings.

16. A method of forming a strut, the method comprising:
placing a tubular metal member in a strut-shaped mold, wherein the tubular metal member comprises a wall comprising a plurality of through openings;
placing reinforcing fibers in the mold around the tubular metal member;
filling the mold with a composite resin;
allowing the composite resin to cure to at least partially embed the tubular metal member in the composite resin and to cover the plurality of through openings; and
removing the cured composite resin and tubular metal member from the mold, wherein the cured composite resin defines a fiber-reinforced, elongate composite body comprising composite body first and second ends forming first and second load-bearing end portions of the strut.

17. The method of claim 16, further comprising winding at least one fiber around the tubular metal member in a radial or lengthwise direction before filling the mold with the composite resin.

18. The method of claim 16, further comprising:
placing reinforcing fibers in an interior of the tubular metal member;
filling the interior of the tubular metal member with a curable material; and
allowing the curable material to cure before placing the tubular metal member in the strut-shaped mold.

19. The method of claim 16, wherein the wall of the tubular metal member is cylindrical.

* * * * *

UNITED STATES PATENT AND TRADEMARK OFFICE
CERTIFICATE OF CORRECTION

| | |
|---|---|
| PATENT NO. | : 8,136,758 B2 |
| APPLICATION NO. | : 12/216866 |
| DATED | : March 20, 2012 |
| INVENTOR(S) | : Douglas J. Steinke et al. |

It is certified that error appears in the above-identified patent and that said Letters Patent is hereby corrected as shown below:

Col. 4, Line 56 (Claim 2), "claim 1, the wall" should be -- claim 1, wherein the wall --

Col. 5, Line 23 (Claim 10), "of through at" should be -- of through openings and at --

Signed and Sealed this
Twenty-third Day of April, 2013

Teresa Stanek Rea
*Acting Director of the United States Patent and Trademark Office*